Feb. 12, 1952     L. R. BURR     2,585,087
REFRIGERATING ASSEMBLY FOR MOBILE EQUIPMENT
Filed Oct. 18, 1948     3 Sheets-Sheet 1
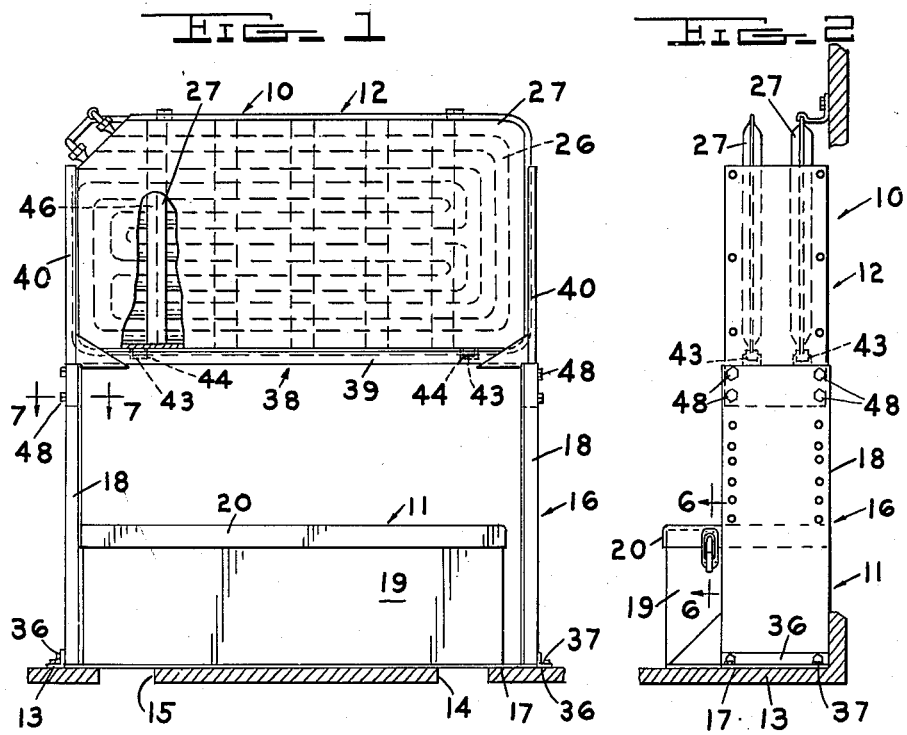
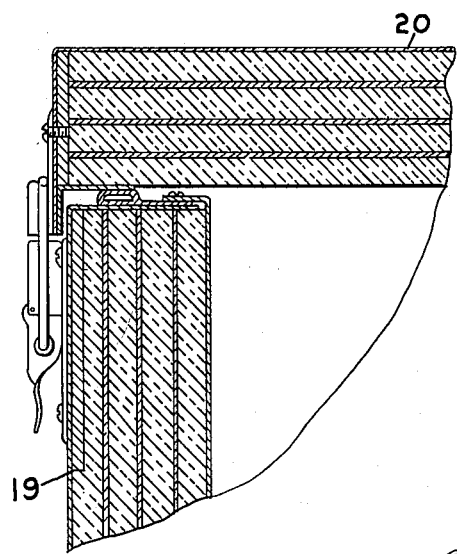
INVENTOR.
LAUREN R. BURR
BY
ATTORNEYS

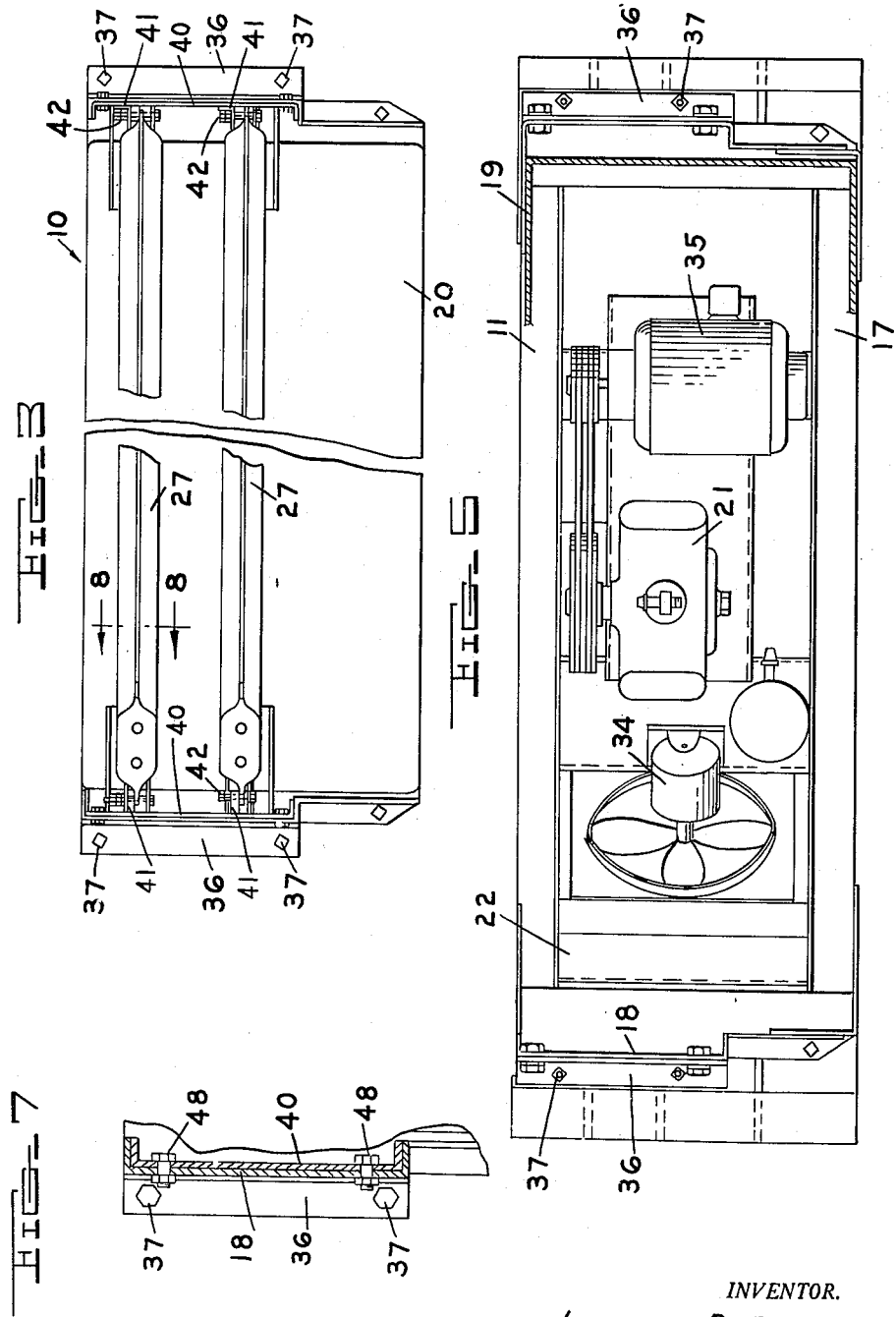

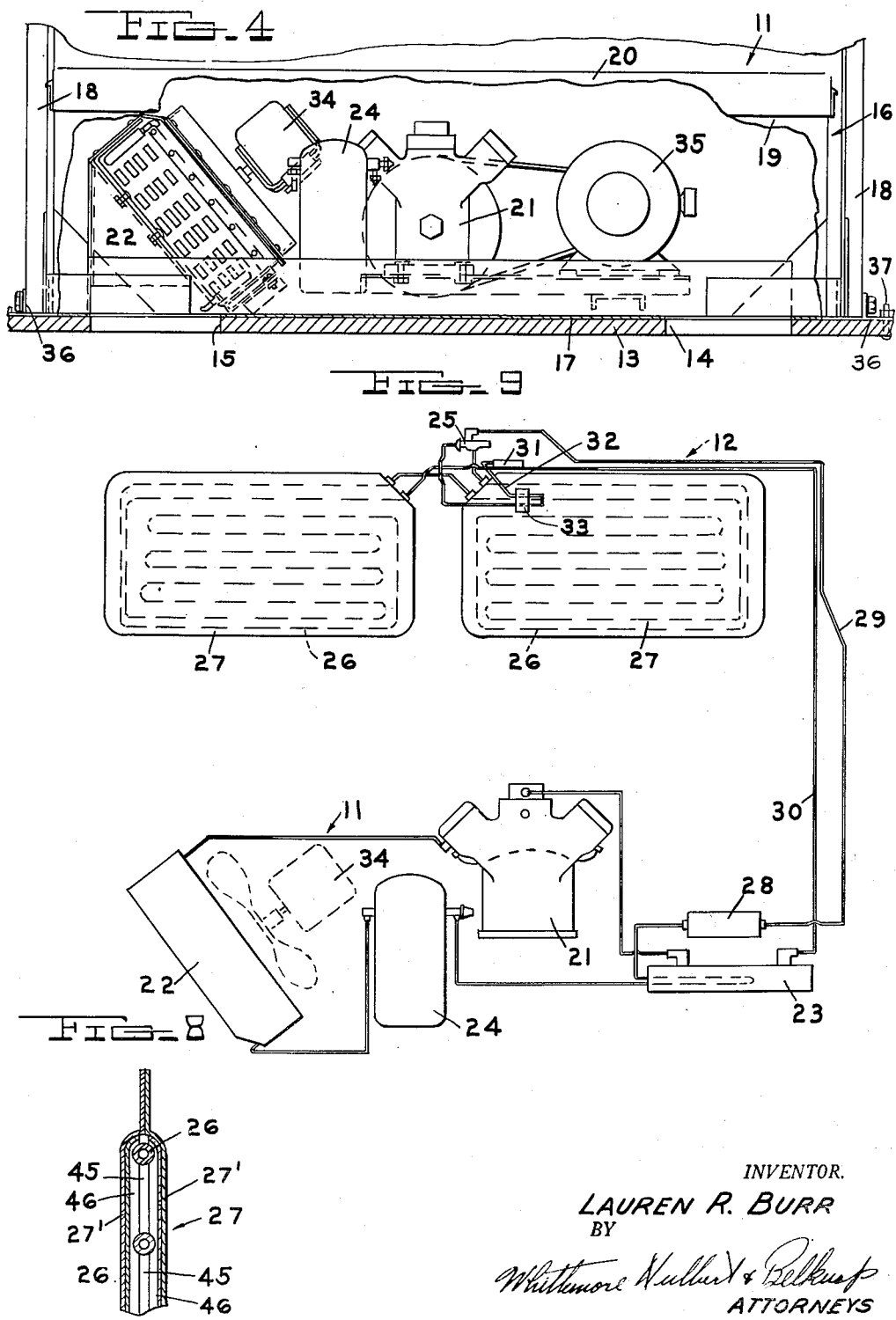

Patented Feb. 12, 1952

2,585,087

UNITED STATES PATENT OFFICE 2,585,087

REFRIGERATING ASSEMBLY FOR MOBILE EQUIPMENT

Lauren R. Burr, Lansing, Mich., assignor to Kold Hold Manufacturing Company, Lansing, Mich., a corporation of Michigan Application October 18, 1948, Serial No. 55,136

4 Claims. (Cl. 62—117)

This invention relates generally to refrigerating equipment and refers more particularly to refrigerating systems embodying a cooling unit of the so-called hold-over type.

In refrigerating systems operating on the hold-over principle the space requiring refrigeration is maintained at the specified temperature during "off" periods of the refrigerant circulating apparatus by the cooling effect of a hold-over medium having a relatively low eutectic freeze point and itself cooled by the refrigerant during the periods of circulation of the latter.

Refrigerating systems of the above general type find particular utility in the refrigeration of mobile storage equipment, such for example, as truck or trailer bodies. However, in employing the hold-over type of refrigeration in mobile equipment, it has been customary to support only the hold-over plates and evaporator of the refrigerant circulating apparatus within the body. The remaining instrumentalities of the refrigerant circulating apparatus remained at certain selected depots making it necessary to periodically return the mobile equipment to one of these depots for recooling.

With the above in view it is one of the objects of this invention to provide a refrigerating system of the hold-over type capable of being installed within a vehicle body and being sufficiently complete to enable recooling the eutectic medium at any point equipped with a standard electric utility outlet.

Another object of this invention is to provide a refrigerating system wherein the refrigerant circulating apparatus and the hold-over cooling unit form a self-contained assembly or unit of a size to occupy a very small amount of space within a vehicle body.

Still another feature of this invention is to provide a refrigerating system of the foregoing type wherein the refrigerant circulating apparatus, except the evaporator, is housed in a compact casing carried by a frame and wherein the hold-over cooling unit including the evaporator is supported on the frame above the casing.

A further object of this invention is to provide an arrangement of the type noted in the preceding paragraph wherein the hold-over cooling unit is vertically adjustable relative to the casing to compensate for vehicle bodies of different heights.

The foregoing as well as other objects will be made more apparent as this description proceeds, especially when considered in connection with the accompanying drawings, wherein:

Figure 1 is a front elevational view of a refrigerating system embodying the features of this invention;

Figure 2 is a side elevational view of the construction shown in Figure 1;

Figure 3 is a top plan view of the construction shown in Figure 1;

Figure 4 is a side elevational view of a part of the system shown in Figure 1;

Figure 5 is a plan view of the part shown in Figure 4;

Figure 6 is a sectional view taken on the line 6—6 of Figure 2;

Figure 7 is a sectional view taken on the line 7—7 of Figure 1;

Figure 8 is a sectional view taken on the line 8—8 of Figure 3; and

Figure 9 is a diagrammatic view of the refrigeration circuit.

It will be understood as this description proceeds that the present invention may be advantageously employed for effectively cooling a variety of types of storage spaces. However the invention is particularly adapted for use in refrigerating the storage space of mobile equipment, such for example, as trucks and the like. This is true because the refrigerating system is a self-contained compact unit or package capable of being readily inserted as an assembly within the body and occupies a very small amount of the available pay load space.

With the above in view, reference is made more in detail to the drawings, wherein the numeral 10 designates a compact self-contained refrigerating system of the hold-over type. This system comprises a bottom assembly 11 and a top assembly 12. The two assemblies are secured together to form a unit and the bottom assembly is adapted to rest on a supporting surface, such for example, as the body flooring 13 having laterally spaced air intake and outlet openings 14 and 15, respectively.

The bottom assembly 11 comprises a frame 16 having a base plate 17 and having laterally spaced channels 18 extending upwardly from the base 17. The lower ends of the channels are welded or otherwise permanently secured to the base plate 17 to form, in effect, an integral structure. Secured to the base plate 17 between the upright channels 18 is a casing 19 having the upper end open and adapted to be closed by a removable cover 20.

Supported within the casing 19 are a plurality of instrumentalities of a suitable refrigerating apparatus. This apparatus may be of any orthodox direct expansion type and need not be described in detail herein. The apparatus selected herein for the purpose of illustration is diagrammatically shown in Figure 9 of the drawings. In general the apparatus comprises a compressor 21, a condenser 22 having the intake side connected to the compressor, a heat exchanger and accumulator 23, a receiver 24 connected between the discharge side of the condenser and accumulator. The above instrumentalities may be considered to constitute the high pressure side of the refrigerating circuit, and the heat exchanger 23 is connected to the low pressure side of the circuit through an expansion valve 25. The low pressure side of the refrigerating circuit comprises a plurality of expansion coils 26 connected in series and respectively enclosed within plates 27 to be presently described.

Referring more in detail to the connections between the high and low pressure sides of the refrigeration circuit, it will be noted from Figure 9 of the drawings that the heat exchanger is connected to the expansion valve through a strainer 28 by a supply conduit 29, and the expansion valve in turn is connected to the inlet end of one of the expansion coils. The outlet end of this expansion coil is connected to the intake end of the next adjacent expansion coil, and the discharge end of the latter expansion coil is connected to the heat exchanger by a return conduit 30. It will also be noted that an expansion valve bulb 31 is clamped or otherwise suitably secured to the top side of the return conduit 30, and that this bulb is connected in the capillary 32 provided for controlling the action of the expansive valve. In addition a supplementary bulb 33 is incorporated in the capillary 32 and the purpose of this bulb is to discontinue the feed to the expansion valve on the off-cycle of the refrigerating circuit.

The apparatus briefly described above for circulating the refrigerant forms no part of the present invention, and may be varied considerably to suit different requirements without departing from the spirit and scope of this invention. In any case the compressor 21, condenser 22, heat exchanger and accumulator 23, receiver 24 and strainer 28, together with the blower 34 for the condenser and the motor 35 for the compressor, are all compactly arranged within the casing 19. As shown particularly in Figure 4 of the drawings, the above enumerated instrumentalities are removably secured to suitable brackets, which in turn, are permanently secured to the base plate 17 of the frame 16. It may be pointed out at this time that the base plate 17 also forms the bottom wall of the casing 19, and is formed with laterally spaced openings which respectively register with the intake and outlet openings 14 and 15. The purpose of these openings is to enable the circulation of air through the casing to assist in cooling the condenser and associated parts of the refrigerating apparatus.

The side walls of the casing may be permanently secured to the base plate 17, and the interior of the casing is accessible by removing the cover 20. The side walls as well as the cover 20 are highly insulated as shown in Figure 6 of the drawing to prevent the escape of heat within the casing into the refrigerated storage space.

It will also be noted from Figure 4 of the drawings that the bottom assembly or frame 16 is removably clamped to the floor 13 by anchor brackets 36 having upright flanges respectively secured to the frame members 18 at the bottom thereof and having horizontal flanges resting on the floor 13. The horizontal flanges are apertured to receive suitable bolts 37 for detachably securing the assembly 16 to the flooring 13.

The top assembly 12 of the refrigerating system comprises a substantially U-shaped frame 38 having a base 39 substantially channel-shaped in cross section and having upwardly extending side channels 40. The side channels extend downwardly below the base 39 and are respectively secured to the upright channels 18 on the bottom frame 16.

The frame 38 supports the expansion coils 26 and the plates 27 within which the expansion coils are enclosed. In this connection attention is directed to Figure 3 of the drawings wherein it will be noted that the opposite ends of the plates 27 are secured to the vertical channels 40 by brackets 41 and fastener elements 42. The bottom edges of the plates 27 are shown in Figure 2 of the drawings as resting on blocks 43 which are secured to the base 39 of the frame 38 by retaining channels 44.

The plates 27 are each formed of laterally spaced substantially flat sheets 27' embossed or shaped to provide marginal flanges which are welded or otherwise permanently secured together to form a sealed chamber 45 between the plates. The expansion coils 26 are each formed of a continuous length of seamless tubing bent to the required coil shape and supported within the sealed chamber 45 of one of the plates with the opposite ends extending through one edge of the plate in side by side relationship to provide intake and outlet openings for the refrigerant. The coils 26 of the evaporators are respectively held in position within the plates 27 or chambers 45 by fins 46 which also enhance the heat exchange characteristics of the unit. The fins are arranged in pairs and are welded or otherwise secured in opposed relationship to the inner surfaces of the sheets 27' of each plate. The adjacent edges of the fins 46 of each pair are recessed to receive the adjacent portion of the coil 26 and clamp the latter in place.

The chamber 45 in both plates contains a so-called hold-over medium or solution having a relatively low eutectic freeze point. This solution is cooled or frozen by the expansion coils when the refrigerant circulating apparatus is placed in operation, and the capacity of the system is predetermined in dependence upon the volume of the storage space to be refrigerated, so that this space is maintained at the specified temperature by the hold-over plates for long periods of time. The construction is such that the plates 27 may be periodically serviced to build up the refrigeration reserve at any point along the route of the mobile equipment where electric power is available by merely "plugging" the supply cord for the electric motor 35 into an electric outlet.

Referring again to Figure 2 of the drawings it will be noted that the plates are supported in laterally spaced vertical planes to enable unobstructed circulation of air therebetween. In order to insure proper air circulation the top edges of the plates are spaced below the top wall of the storage space requiring refrigeration, and in order to insure the provision of such a space in vehicle bodies of different heights, the top frame 38 is vertically adjustable with respect to the bottom frame 16. In this connection it will be noted that the lower ends of the upright channels 40 on the top frame respectively slidably engage the upper ends of the vertical frame members 18 on the lower frame 16. Also the supply and return conduits 29 and 30 respectively are formed of a flexible material to enable the vertical adjustment noted above. The opposite sides 40 of the top frame 38 are respectively removably secured to the upright frame members 18 by bolts 48, and the upright frame members 18 are formed with a plurality of vertically spaced openings therethrough for selectively receiving the bolts 48. Thus the top section 12 of the refrigerating system may be secured to the bottom section 11 in any one of a number of different vertical positions relative to the latter section, and thereby the unit or package 10 may be readily installed within storage spaces of varying height.

What I claim as my invention is:

1. A refrigerating unit for cooling a compartment in a vehicle while in transit and separated from energizing means, comprising an electric motor, a compressor and accessories, a thermally insulated housing for completely enclosing the same, a hold-over cold storage and heat exchange element including the evaporator located external to said housing and together therewith adapted to be placed in the compartment to be cooled, and means for intermittently connecting said electric motor with a stationary source of electrical energy operating only when the vehicle is at a station, thereby renewing the cold storage.

2. A refrigerating unit for cooling a compartment of a vehicle while in transit and separated from energizing means, comprising an electric motor, a compressor and accessories, a thermally insulated housing for completely enclosing the same, a hold-over cold storage and heat exchange element including the evaporator located external to said housing and together therewith being adapted to be placed in the compartment to be cooled, said housing resting on the floor of said compartment and being provided with apertures through its bottom for registering with apertures in said floor, a fan within said housing for circulating air into and out of the same, and means for intermittently connecting said electric motor with a stationary source of electrical energy operating only when the vehicle is at a station to renew the cold storage.

3. A refrigerating unit for cooling a compartment of a vehicle while in transit and separated from energizing means, comprising an electric motor, a compressor and accessories, a thermally insulated housing completely enclosing the same, a hold-over cold storage and heat exchange element including the evaporator external to said housing and together therewith adapted to be placed in the compartment to be cooled, a frame extending above said housing on which said cold storage and heat exchange element is vertically adjustably mounted to adapt the same to the height of the compartment, and means for intermittently energizing said electric motor operating only when the vehicle is at a station and from a stationary source of electrical energy to renew the hold-over cold storage.

4. A refrigerating unit for cooling a compartment of a vehicle while in transit and separated from energizing means comprising an electric motor, a compressor and accessories, a thermally insulated housing for completely enclosing the same, a frame extending above said housing, a hold-over cold storage and heat exchange element including the evaporator mounted on said frame, spaced above said housing and together therewith being adapted to be placed in the compartment to be cooled, said housing resting on the floor of said compartment and being provided with apertures through its bottom for registering with apertures in said floor, a fan within said housing for circulating air into and out of the same through said apertures, and means for intermittently connecting said electric motor with a stationary source of electrical energy operating only when the vehicle is at a station to renew the cold storage.

LAUREN R. BURR.

REFERENCES CITED

The following references are of record in the file of this patent:

UNITED STATES PATENTS

| Number | Name | Date |
|---|---|---|
| 1,825,694 | Hobart | Oct. 6, 1931 |
| 1,943,317 | Hulse | Jan. 16, 1934 |
| 2,036,979 | Askin | Apr. 7, 1936 |
| 2,169,201 | Very | Aug. 8, 1939 |
| 2,197,722 | Henny | Apr. 16, 1940 |
| 2,365,786 | Tull | Dec. 26, 1944 |
| 2,405,432 | Kleist | Aug. 6, 1946 |
| 2,410,449 | Kleist | Nov. 5, 1946 |
| 2,475,841 | Jones | July 12, 1949 |